United States Patent [19]

Naef

[11] Patent Number: 5,466,894
[45] Date of Patent: Nov. 14, 1995

[54] METHOD FOR SUPPLYING PRE-DEFINED FILLING QUANTITIES OF BULK MATERIAL BY EXACT WEIGHT AS WELL AS FILLING APPARATUS

[75] Inventor: Peter Naef, Heiden, Switzerland

[73] Assignee: Buehler AG, Uzwil, Switzerland

[21] Appl. No.: 927,275

[22] PCT Filed: Jan. 13, 1992

[86] PCT No.: PCT/CH92/00006

§ 371 Date: Sep. 14, 1992

§ 102(e) Date: Sep. 14, 1992

[87] PCT Pub. No.: WO92/12899

PCT Pub. Date: Jun. 8, 1992

[30] Foreign Application Priority Data

Jan. 29, 1991 [CH] Switzerland ............... 272/91
Mar. 15, 1991 [CH] Switzerland ............... 795/91

[51] Int. Cl.[6] .................................................. G01G 13/16
[52] U.S. Cl. .................................. 177/59; 141/83; 222/55
[58] Field of Search .................................. 177/59; 141/83, 141/10, 313, 314; 222/55, 56, 77, 412, 413

[56] References Cited

U.S. PATENT DOCUMENTS

| | | | |
|---|---|---|---|
| Re. 32,101 | 4/1986 | Ricciardi et al. | 177/185 X |
| 4,505,311 | 3/1985 | Krämer et al. | 141/129 |
| 4,528,848 | 7/1985 | Häfner | 73/218 |
| 4,682,915 | 7/1987 | Häfner | 177/59 X |
| 4,905,957 | 8/1990 | Kardux et al. | 141/83 |
| 4,928,473 | 5/1990 | Nagao et al. | 177/58 X |
| 4,944,428 | 7/1990 | Gmür et al. | 177/50 X |
| 5,024,352 | 6/1991 | Gmür et al. | 177/50 X |
| 5,038,973 | 8/1991 | Gmür | 177/25.12 X |
| 5,121,638 | 6/1992 | Gmür | 73/861 |
| 5,148,943 | 9/1992 | Moller | 177/50 X |
| 5,161,714 | 11/1992 | Neumann et al. | 222/55 |
| 5,184,754 | 2/1993 | Hansen | 222/55 |

OTHER PUBLICATIONS

Ricciardi, Ronald et al WO89/07574 Aug. 24, 1989.

Primary Examiner—Peter S. Wong
Assistant Examiner—Randy W. Gibson
Attorney, Agent, or Firm—Finnegan, Henderson, Farabow, Garrett & Dunner

[57] ABSTRACT

A method and an apparatus for the automatic filling of shipping bags with bulk materials with weighing accuracy. The pre-defined bulk material filling quantities are produced cyclically by controlling the discharge from a differential packer and weigher by determining the differential weight and are poured directly into the package via a flow filling sleeve. The pre-defined bulk material weight is directly packed as a dense stream on the shortest path via a flow filling sleeve. The majority of problems relating to weighing technology can be shifted to the area of the refilling of the differential weigher container with no disadvantageous results and no longer occur during the formation of the filling weight. The highest hourly outputs can be achieved particularly for packing carousels.

20 Claims, 10 Drawing Sheets

$$t = \sqrt{\frac{2H}{g}}$$

METHOD FOR SUPPLYING PRE-DEFINED FILLING QUANTITIES OF BULK MATERIAL BY EXACT WEIGHT AS WELL AS FILLING APPARATUS

TECHNICAL FIELD

The invention is directed to a method for supplying pre-defined bulk material weights in an exact manner in shipping packages, particularly in bags, as well as to an automatic filling apparatus.

Background Art

Aside from classic shipping packages, specialized filling and packing arrangements for consumer packaging are known in the area of the so-called packing industry. As a rule, filling quantities of several hundred grams, at most several kilograms, are supplied. In general, 5–10 kg weights are felt to be the upper limit. The size is adapted for easy handling for sale and for the consumer and from the retail store to the final consumer, e.g. in the kitchen. Shipping packages serve primarily for transporting from one processing plant to the next, in the classic case from the mill to the baker. The weight of shipping packages, which is usually suited to male workers, is between 20 and 100 kg.

In practice, three stages of automation developed for filling shipping bags correspond to the specific requirements:
— automatic preparation of portions hanging and closing of bag manually
— automatic preparation of portions hanging of bags manually fully automatic closing of bags
— automatic preparation of portions fully automatic hanging of bags and closing of bags This shows that the preparation of portions is the basis in every case for all stages of automation. The core problem consists in forming and precisely weighing bulk good portions within a short span of time. One and the same bulk material can behave differently: the goods may be mixed with air when transported and behave more or less like liquid, or extreme conditions, such as heat or cold, of the machine elements and the resulting adhesion between the bulk material and wall parts may also be troublesome.

The contents of the bag represent small portions in comparison to the dimensions of storage silo installations. Nevertheless, filling equipment of intermediate depots, for example, have large dimensions. Assuming room heights of 3 to 4 m, the packing devices take up one to two floors.

After the bulk weigher, a weigher discharge hopper is usually used so that the entire contents of the weigher are collected in an intermediate buffer prior to packing, which likewise requires height.

Counter to the practice of the past two decades of replacing the bag by tank and large-container transportation, there is now a reverse trend toward small shipping packages, i.e. the bag. In many countries, professional associations demand a reduction in bag weight, e.g. of 50 to 25 kg, which means a doubling of the quantity of bags with the same output tonnage. For this reason there is an increasing demand for packing stations with a very high unit output capacity. So-called valve bags are most widely used for especially fine industrial products like cement, lime, plastics, etc. The bag is filled with product via a beak-like filling neck or sleeve through a correspondingly small valve opening of the bag. After the desired weight is reached, the bag opening can be closed immediately by means of prepared paper folds.

The enormous advantage consists in that the product is only very seldom mixed with air. The chief disadvantage of this system consists in its limited use. Grains, semolina, flour, bran, and feedstuff, etc. have sharply differing bulk weights as is well known, so that with different products the same bag size can be filled with different weights.

In classic flour bags, on the other hand, a small amount of empty space in the filled, closed paper or plastic bag is not troublesome since this bag is tightly closed after filling, either by a sewing machine or by means of glue.

The bag is suitable for simple shipping of unit goods over long distances and is a convenient unit for optimal "handling" in the plant in many respects. Depending on the specific product, particular criteria, such as questions of hygiene, dust-free, tight bag filling, are important. In almost all cases, the buyer demands precise filling weight of each individual bag. However, filling a large number of individual bags per hour by exact weight can only be accomplished cheaply by a high degree of automation. Generally, certain methodical rules must be observed by lawmakers in the so-called net weight packer and weigher concerning standard weight regulations. This results in the following weighing sequence for supplying a pre-defined filling quantity:
— zero taring of the weighing container
— coarse proportioning
— fine proportioning
— stoppage
— monitoring of the filling quantity or prescribed weight
— possible adjustment of the coarse flow or fast feed and/or fine flow or dribble feed switch-off point.

At higher packing outputs, the zero taring and the monitoring of the filling quantity and resulting adjustment of the fine flow or dribble feed switch-off point can only be effected cyclically, that is e.g. at every twentieth emptying or discharge. The following weight influencing variables are to be taken into consideration in addition:
— the impact pressure of the fast feed and dribble feed
— the Doppler effect
— the after-flow of the fast feed and dribble feed
— the different fall heights with different packing weights.

Over the course of decades, the so-called packer and weigher was developed for the specific problem to be solved, the net weight packer and weigher being most commonly used. The predetermined portion weight is prepared by exact weight in the packer and weigher itself and is poured into the bag in the shortest possible time after hanging an empty bag at a bag filling sleeve. In this way, several hundred to a thousand portions or more are prepared per hour and the product is poured into the corresponding number of bags. Substantially greater outputs are required at present for many applications, e.g., up to 2000 portions per hour.

The net weight packer and weigher machines empty the filling weight suddenly and at very high output. This results in some problems which must be taken seriously. The bag is inflated sharply by the displacement of air caused by the filling and additionally loads the bag material. In addition, the bulk material takes on a considerable amount of air during emptying in the case of powder-like products and the removal of the air from the bag filling sleeve presents another known problem. The bag filling sleeve must also be as large as possible for reasons of optimal removal of air and rapid filling. In order to achieve high outputs, a high degree of automation is required and therefore an automatic bag hanger is used. However, large bag filling sleeves considerably impair the operating reliability of a mechanical bag spreader. For products which can be reduced in volume by compression elements in order to decrease the size of the finished package and economize on expensive bag material, the compression time is increased because of the intensive fluidization of the product and the packing output is reduced.

A weigher bulk hopper is used as a link from the weigher to the bag filling sleeve. Adhesions in this hopper influence the weight accuracy of the package on the one hand and have a very negative effect on hygiene on the other hand. A frequent cleaning, particularly of the bulk hopper, is unavoidable especially with products having a strong tendency to adhere.

One of the aims of the invention was to reduce the physical height brought about by the container technique and in particular to keep disturbing influences on the displacement path of the bulk material as slight as possible.

OBJECT AND SUMMARY OF THE INVENTION

The invention has, as a primary object particularly eliminating the known disadvantages as far as possible and shortening the packing process, i.e. increasing the output.

The method according to the invention comprises the steps of pouring the bulk material poured as a dense stream and providing the filling weight in the bag during the filling process by automatic differential weighing taking place beforehand.

As will be shown in the following, the invention has achieved a breakthrough in increasing the degree of automation, the operating reliability, operating hygiene, and particularly with respect to the output capacity. All technical circles concerned with packing have tried until now at enormous expense, but only partial success, to master the disturbing influencing variables.

But a substantial part of the disturbing effect simply no longer exists as a result of the novel invention. For example:
—no impact pressure of the fast and dribble feeds
—no Doppler effect
—no after-flow of the fast and dribble feeds
—no variable fall height
—no weigher bulk hopper or corresponding dust zone
—no exchangeable sleeves.

The influence of another group of sources of disturbance was drastically reduced:
—only a minimal fluidization still occurs
—the cost of compressing the bulk material in the bag and the need to shake the bag is minimized
—substantial reduction in the size of the bag filling sleeve.

The invention allows a great number of particularly advantageous constructions.

It is suggested that the filling portions be prepared cyclically by controlling the discharge from a differential packer and weigher by determining the differential weight and poured directly into bags via a bag filling sleeve.

The differential weighing system has a differential weighing container with bulk material proportioning and a controlled product discharge as well as computing means which control both the bag filling and weighing container filling processes by weight values of the weighing system.

A refilling of the differential weigher container is preferably effected cyclically in an alternating manner after every filling or after a number of fillings. 1.5 to a maximum of 5 times, preferably 1.5 to 3 times, the amount of a portion is made available in the differential weigher, from which shipping bags of 10 to 100 kg weight can be filled.

The invention is further directed to an automatic filling apparatus particularly for bags for supplying predefined filling quantities by exact weight with a weigher as well as proportioning and controlling devices and is characterized in that it includes a differential packer and weigher with a controllable product discharge device with direct transfer to a bag filling sleeve.

Accordingly, not only can the entire filling apparatus be constructed so as to be simpler, lower and more hygienic, but it allows an enormous step in automation so that the aim of doubling the packing output can be achieved without disadvantages.

The apparatus according to the invention can have diverse further constructions. Thus, in a preferred embodiment form, the product discharge of the differential packer and weigher (1) opens directly into a flow filling sleeve of a bag hanging device. The weighing process can be improved in that a controllable closing device is arranged at the end of the discharge region of the differential packer and weigher.

It is suggested for products with unfavorable flow behavior that the apparatus have an upright weigher container, a variable-speed discharge screw with a substantially horizontally directed discharge from the weigher container, as well as a transition piece from the weigher container to the discharge screw and differential weighing elements. The discharge opens directly into the bag filling sleeve by means of the force of gravity. The differential packer and weigher preferably has both coarse and fine proportioning, the coarse and fine discharge being constructed as controlled compulsory discharge elements, preferably discharge screws. For free flowing products, on the other hand, it is suggested that the product discharge device be constructed as a proportioning with controllable proportioning slides (61, 61').

In another particularly preferred construction of the invention, the differential packer and weigher is associated with a turntable bagging station or packing carousel and transfers the predetermined portions for bagging via a bag filling sleeve or flow filling sleeves, respectively, in the cycle of the packing carousel.

For a construction with the highest packing capacity, preferably two or more differential packer and weigher machines are assigned in an installation to one flow filling sleeve of a packing carousel. The portions can be prepared either in tandem operation or for short periods at twice the hourly output.

It has proven particularly advantageous for the flow filling sleeve to have a free cross-sectional opening which is smaller than or approximately corresponds to the cross section of the product discharge from the weigher container. This step likewise allows an increase in automation, since it is simpler with a smaller bag filling sleeve to carry out the rapid mechanical movements of the bag hanger. In addition, the same bag filling sleeve can be used for a great range of bags e.g. from 20 to 100 kg.

The high-output packing stations have two coarse proportioning weighers and a fine proportioning weigher with associated computing means, and the packing carousel has 3 to 6 flow filling sleeves.

This configuration allows programs to be set up for an exact control of the product displacement so that, e.g. no product remains after a determined product quantity to be packed. Changes of product can also be prepared for and carried out more quickly with the same packing device.

For a better understanding of the present invention, reference is made to the following description and accompanying drawings while the scope of the invention will be pointed out in the appended claims.

BRIEF DESCRIPTION OF THE DRAWINGS

FIG. 6a shows the sequence of movements of FIG. 6 analogous to FIG. 2a;

DETAILED DESCRIPTION OF THE INVENTION, PREFERRED EMBODIMENTS AND BEST MODE

Figure 1:
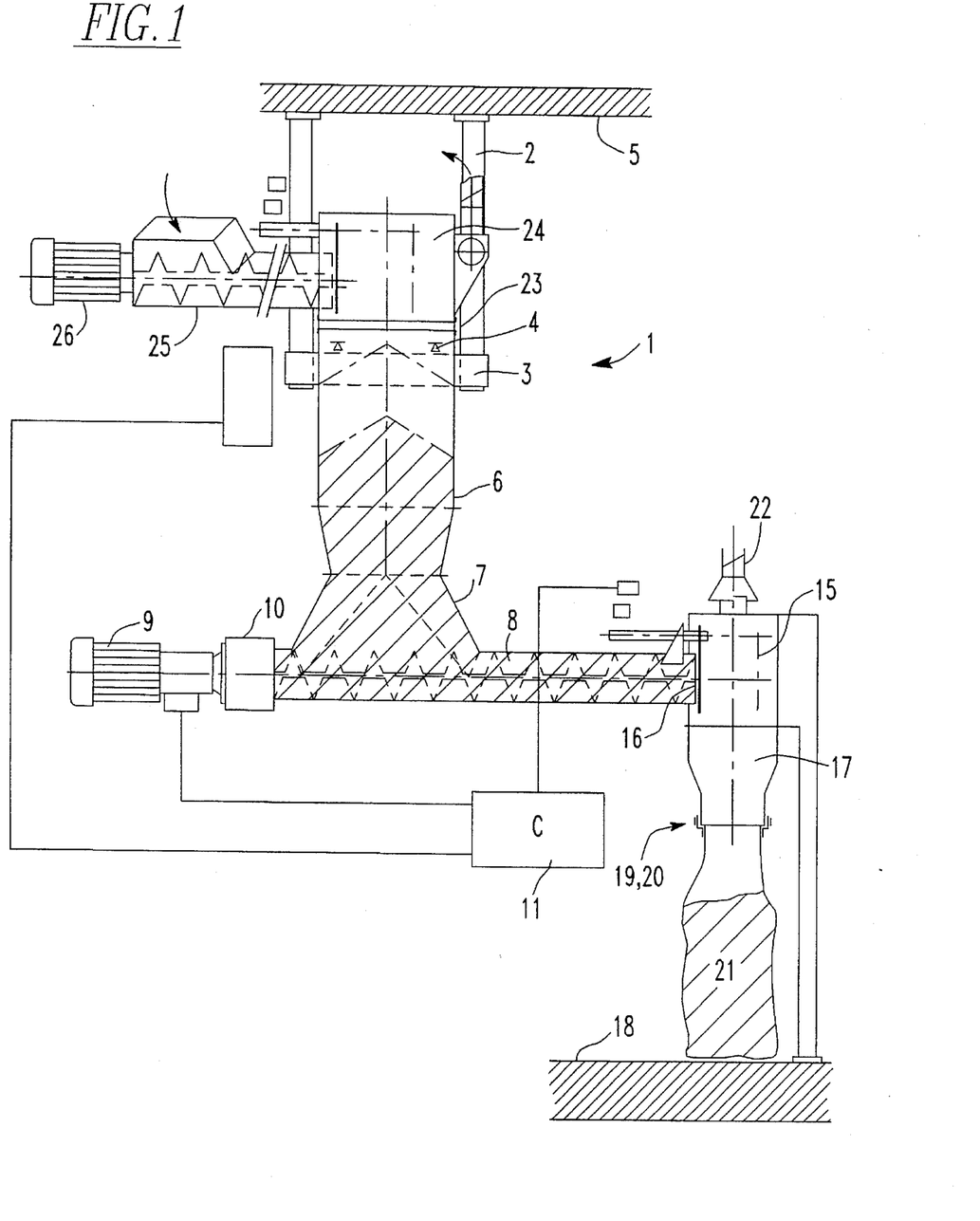
FIG. 1 is a schematic view of a simple packing station with a differential packer and weigher.

Reference is made first to FIG. 1. A differential weigher 1 is supported and suspended, respectively, at the ceiling 5 via columns 2, a platform 3 and weight detecting elements 4.

The differential weigher 1 substantially includes a weighing container 6, a transition piece 7 and a compulsory discharge screw 8 which is driven by a drive motor 9 via a gear unit 10 and is controlled by a computer 11. The fast feed and dribble feed can be effected with a proportioning screw with two speeds or the dribble feed can be effected via a separately driven dribble feed screw, not shown.

The outlet opening 16 is opened and closed via a flap 15 as controlled by the computer 11 in order to prevent uncontrollable after-flow of the feed. A packing head 17 which is supported on the floor 18 independently of the differential weigher 1 has a bag filling sleeve 19 and a bag holder 20 which clamps a bag 21 in FIG. 1. The air displaced in the bag 21 by the product can escape via a vent 22. A product feed head 24 is connected with the weighing container 6 via a rubber diaphragm 23 so as to be tight against dust. A product feed conveyor 25 which is controlled cyclically by the computer 11 via a drive motor 26 and corresponding to the weigher signal opens into the feed head 24.

Figure 2:
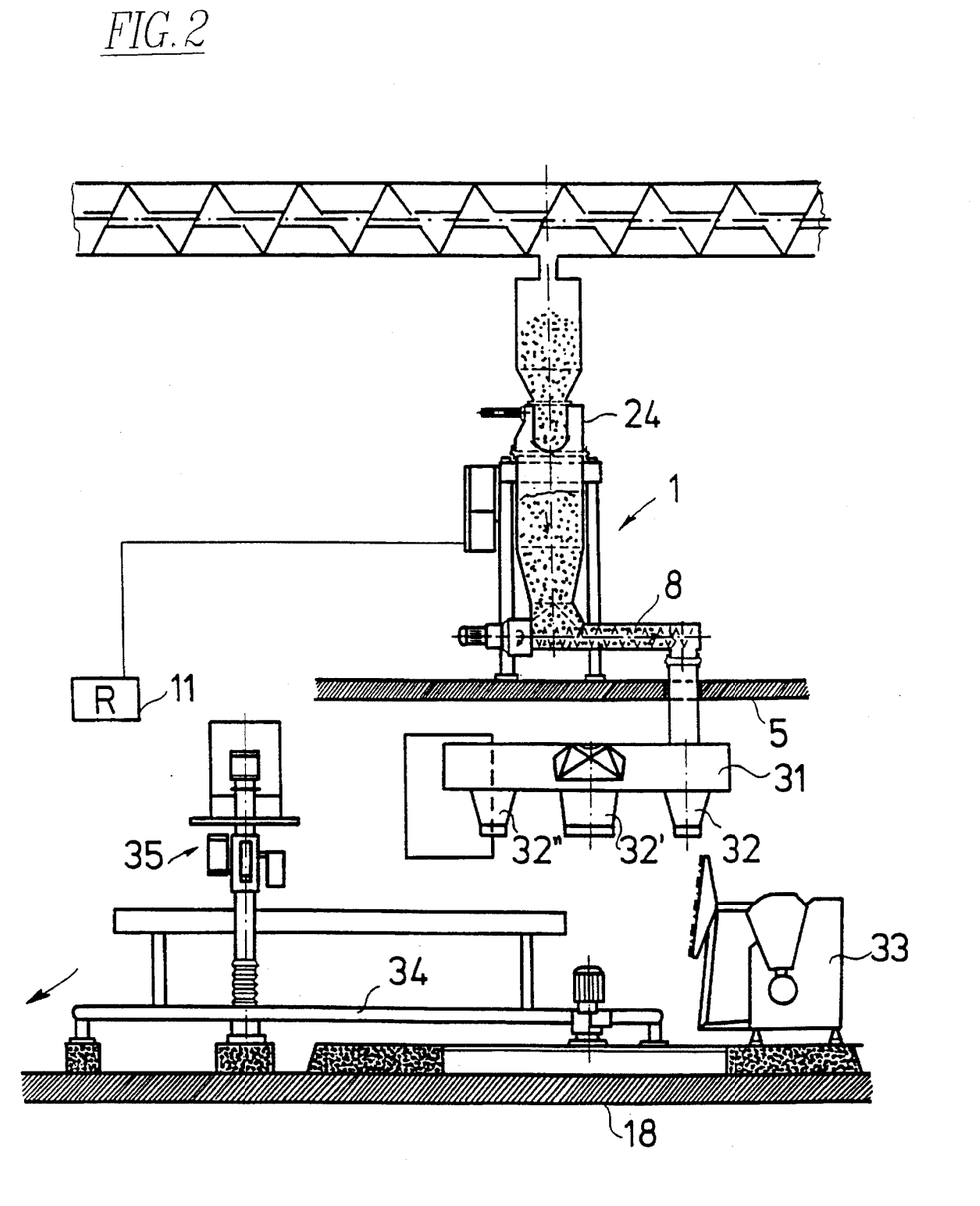
FIG. 2 shows the differential weighing in cooperation with a packing carousel.

FIG. 2 shows a differential weigher 1 directly above a packing carousel 31 at which bag filling sleeves 32, 32', 32" are visible. It is also important that the bag be filled with product uniformly from the bottom to the top, particularly with folding bags. A compression system, e.g. a side packer 33, compresses the product in the bag very efficiently by agitating and oscillating movements during the coarse and fine proportioning at the same intensity from the bottom to the top. Depending on the problem to be solved, a second side packer 33 can also be used, in this case after a bag filling sleeve 32' or 32". After the bag filling and the bag agitating are concluded the bag is deposited on a conveyor belt 34, guided through a sealing station 35 and prepared for shipment.

Figure 2A:
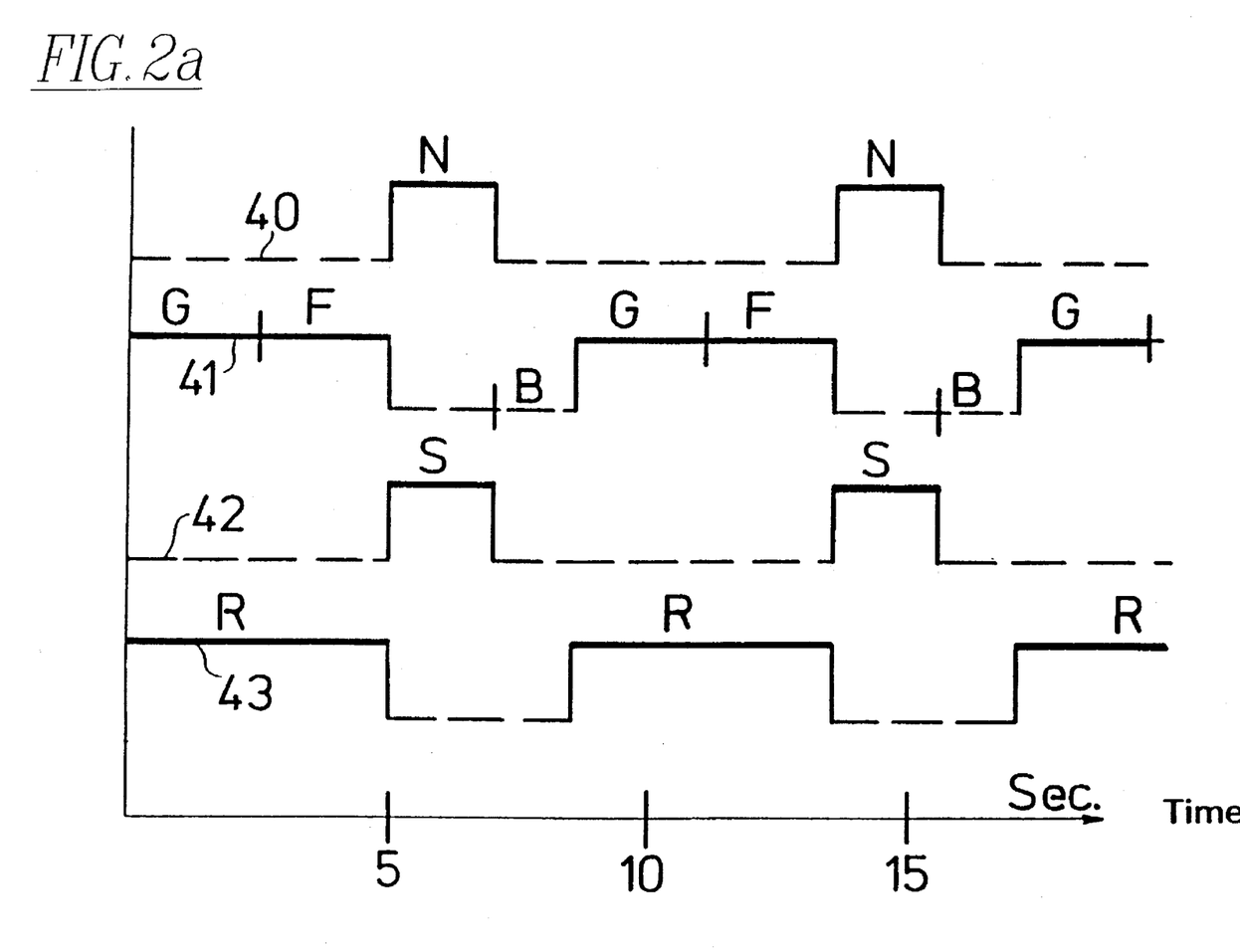
FIG. 2a shows the unfolding sequence of the main packing movements.

FIG. 2a shows a time flow chart, e.g. of a packing carousel according to FIG. 2 with four bag filling sleeves. The curve 40 shows the course of the product refilling N in the differential weigher 1 over time. Curve 41 shows the course of the product discharge from the differential weigher 1, where G is the fast feed, F is the dribble feed and B is the calming period for the weigher. Line 42 shows the time curve of the step movement of the carousel; S signifies the time for a 90-degree step movement of a bag filling sleeve. Curve 43 shows the agitating time R during which the side packer 33 compresses the product.

Figures 3, 3A:
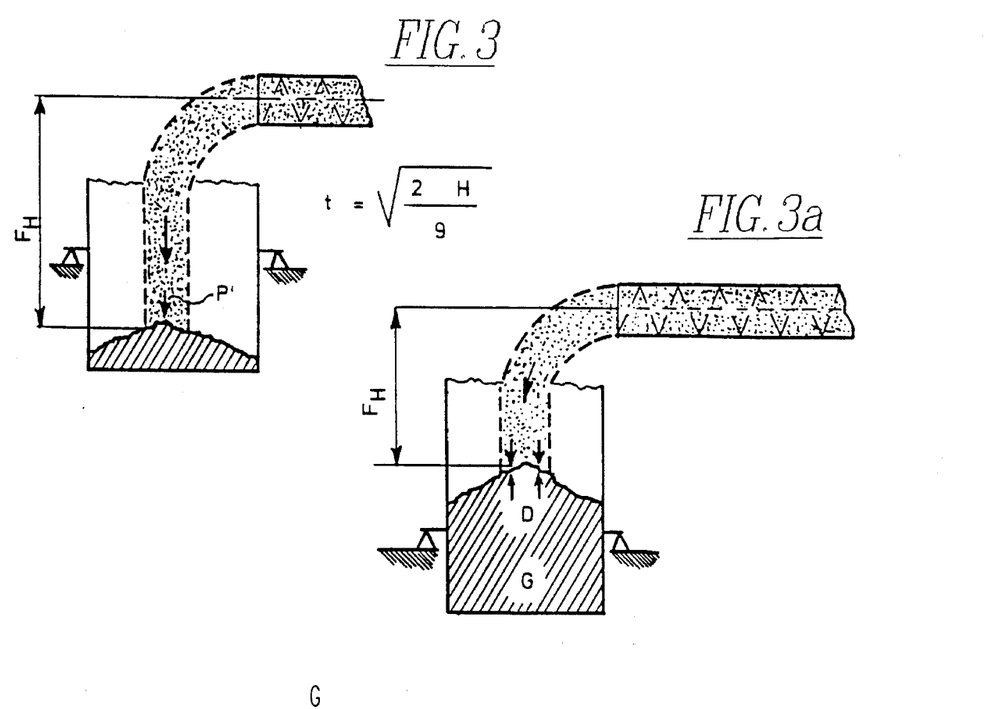
FIGS. 3, 3a show the weighing principle of a net weight packer and weigher.
Figure 4:
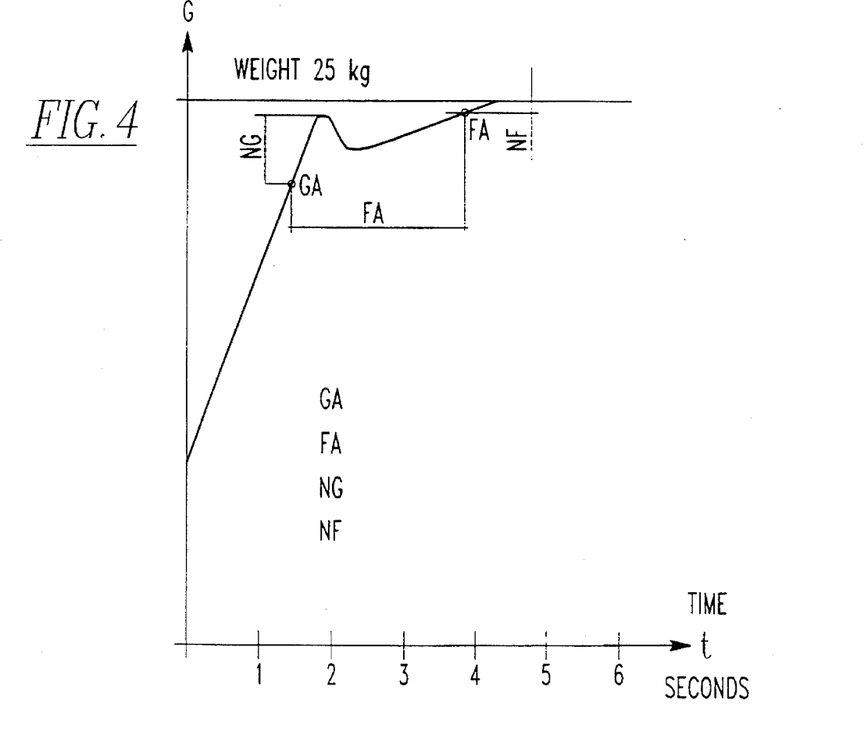
FIG. 4 shows a weight-over-time chart of a net weight packer and weigher of the prior art.

FIGS. 3, 3a and 4 serve to clarify the technical terminology. G=product in the weighing container; P=impact pressure; D=Doppler effect; N=after-flow; FH=fall height.

FIGS. 3 and 3a show that the quantity of after-flow (in dots) is dependent on the fall height. In FIG. 3a the after-flow is less than in FIG. 3. The falling speed of the bulk material increases as the fall height increases. The narrower the cross section of the weighing vessel, the faster the rise of the bulk material level in the weighing vessel. The growing of the bulk material column in the weigher toward the falling product flow presents a phenomenon analogous to the collision of two automobiles. In both cases the force of impact is greater compared to the impact on a stationary body. In weighing technology this is called the Doppler effect. The effective final weight can only be determined when the after-flow has settled in the weighing container and the weigher is calm. This and other disturbing factors must be taken into account in every bulk material container weigher, e.g. by means of corresponding time delays. A weight-over-time chart according to FIG. 4 is known in weighing technology.

Figure 5:
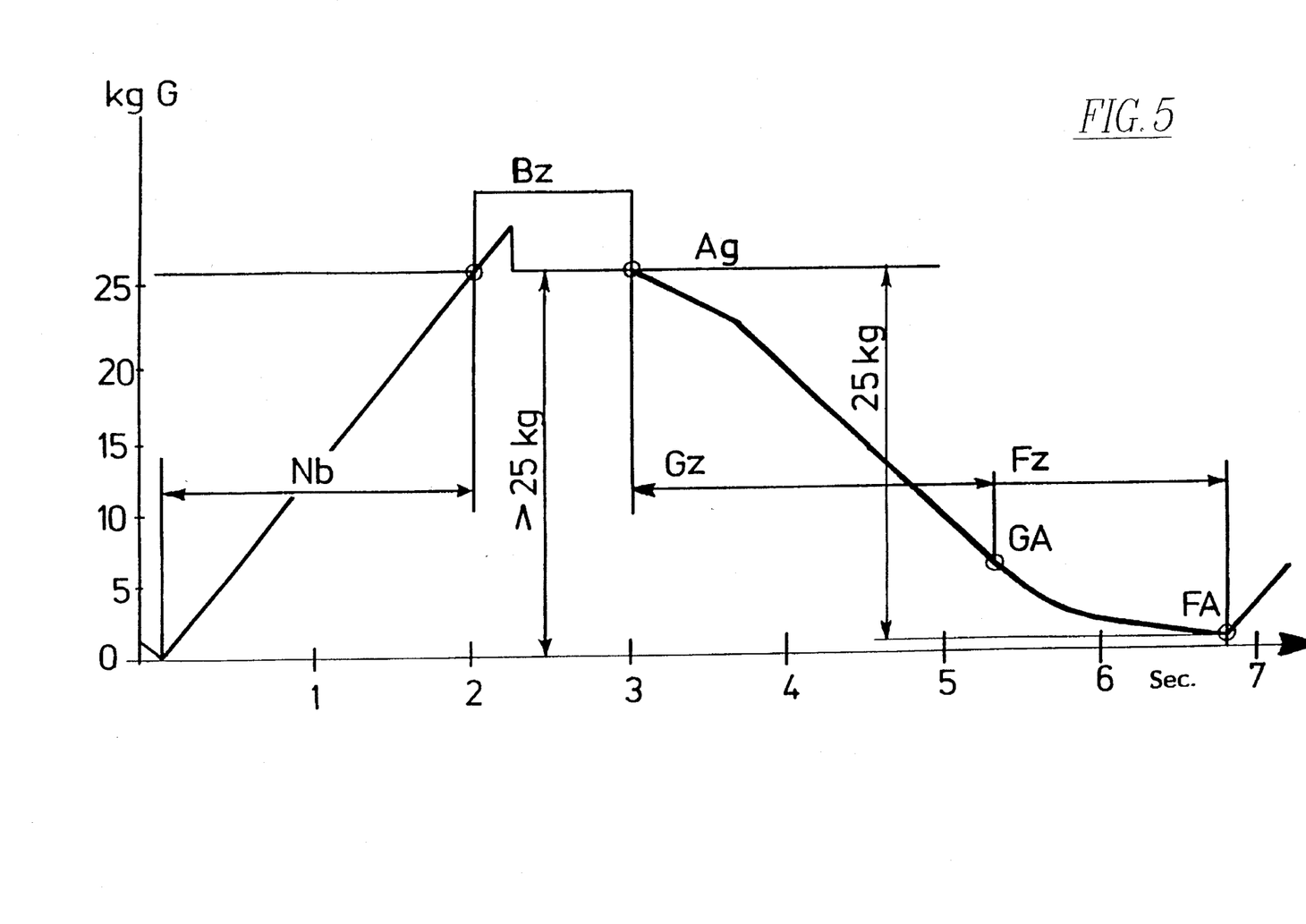
FIG. 5 shows a weight-over-time chart of the novel differential packer and weigher.

FIG. 5 shows a weight-over-time diagram in the differential bulk weigher according to the novel solution. The example shown in the drawing shows an interplay between the filling of the weigher and the filling of the bag.

Approximately 1 to 2 seconds are needed to refill the differential bulk weigher until a weight of approximately 25 kg is reached. A very important fact in this regard is that the differential bulk weigher need not be refilled to an exact pre-defined weight with the exception of the final bag filling quantities since the exact weight is determined in the differential bulk weigher during a standstill after refilling and this exact weight is conveyed to a computer. The filling weight is then discharged in a controlled manner at a pre-defined weight (FA) with the system of differential weighing, first as a fast feed and then as a dribble feed. The filling weight is reached within approximately 4 seconds. It is particularly interesting that the exact actual weight measurement in the weigher coincides immediately with the closing of the discharge proportioning members of the differential bulk weigher or the moment that the last crumbs of bulk material leave the weighing part. The after-flow has already been weighed. The Doppler effect, impact pressure etc. have no perceptible influence on the procurement of the filling weight since they have already taken place outside or subsequent to the weighing. All of the disturbing factors listed above are excluded from the region of the filling phase and shifted to the refilling phase and thus rendered innocuous for the bag filling and procurement of weight.

Figure 6:
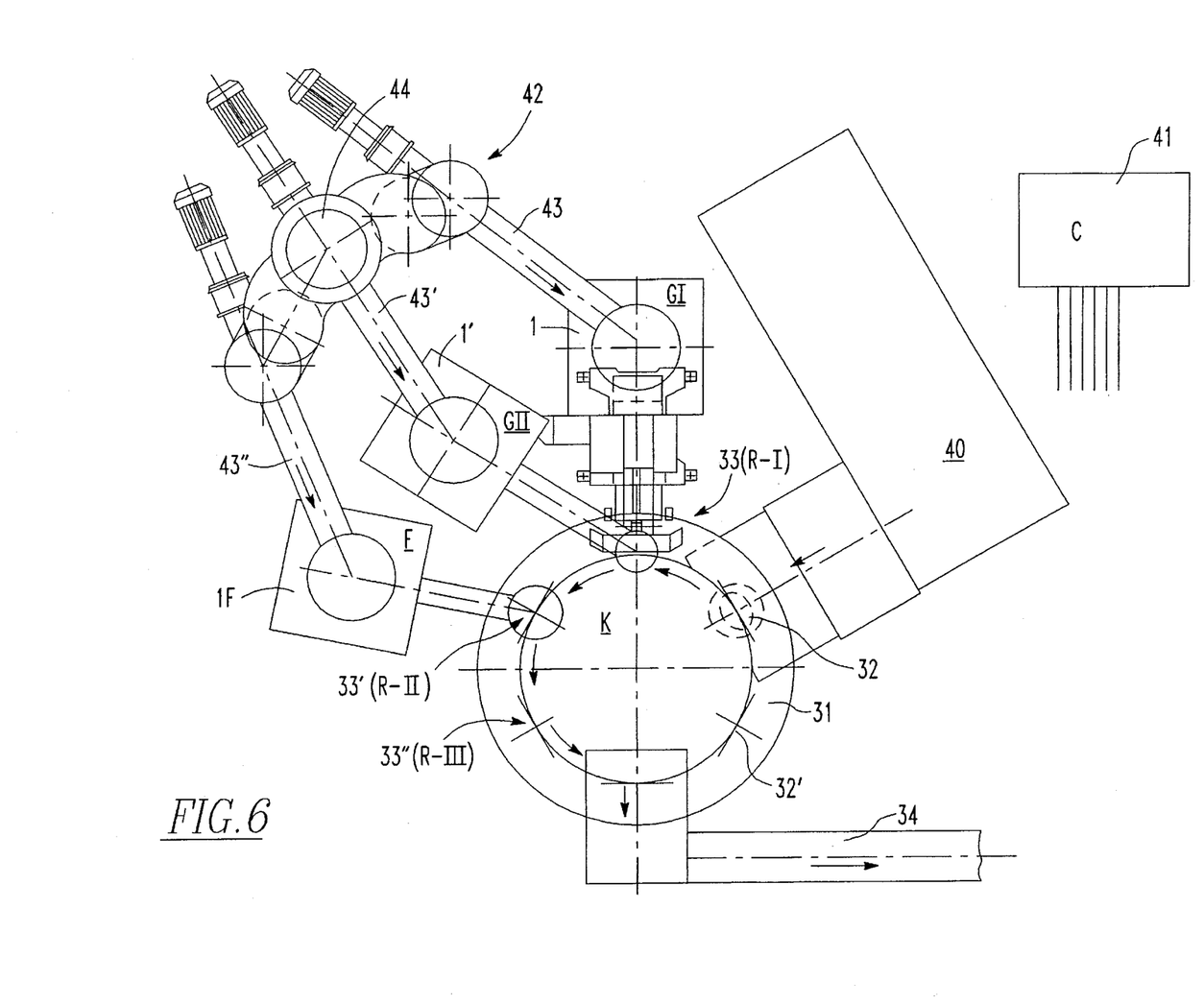
FIG. 6 shows an arrangement for high-output packing, e.g. 1200 bags per hour.

FIG. 6 is a schematic view of a complete packing installation. The bags are suspended from an automatic hanging means 40 at the flow filling sleeve 32 of the packing carousel 31. The filling of the bags is effected alternately by the bulk weigher 1 and 1', respectively, and the refilling and filling are effected in an alternating manner. The fine proportioning is controlled via a computer 1 and a corresponding proportioning command is given to a fine proportioning weigher which is likewise constructed as a differential proportioning weigher. The computer 41 can likewise effect a proportioning of bulk material via a proportioning screw proceeding from a distributor 44. The packing carousel is constructed as a 6-sleeve carousel, the sixth sleeve 32' being provided for hanging the bags manually.

Figure 6A:
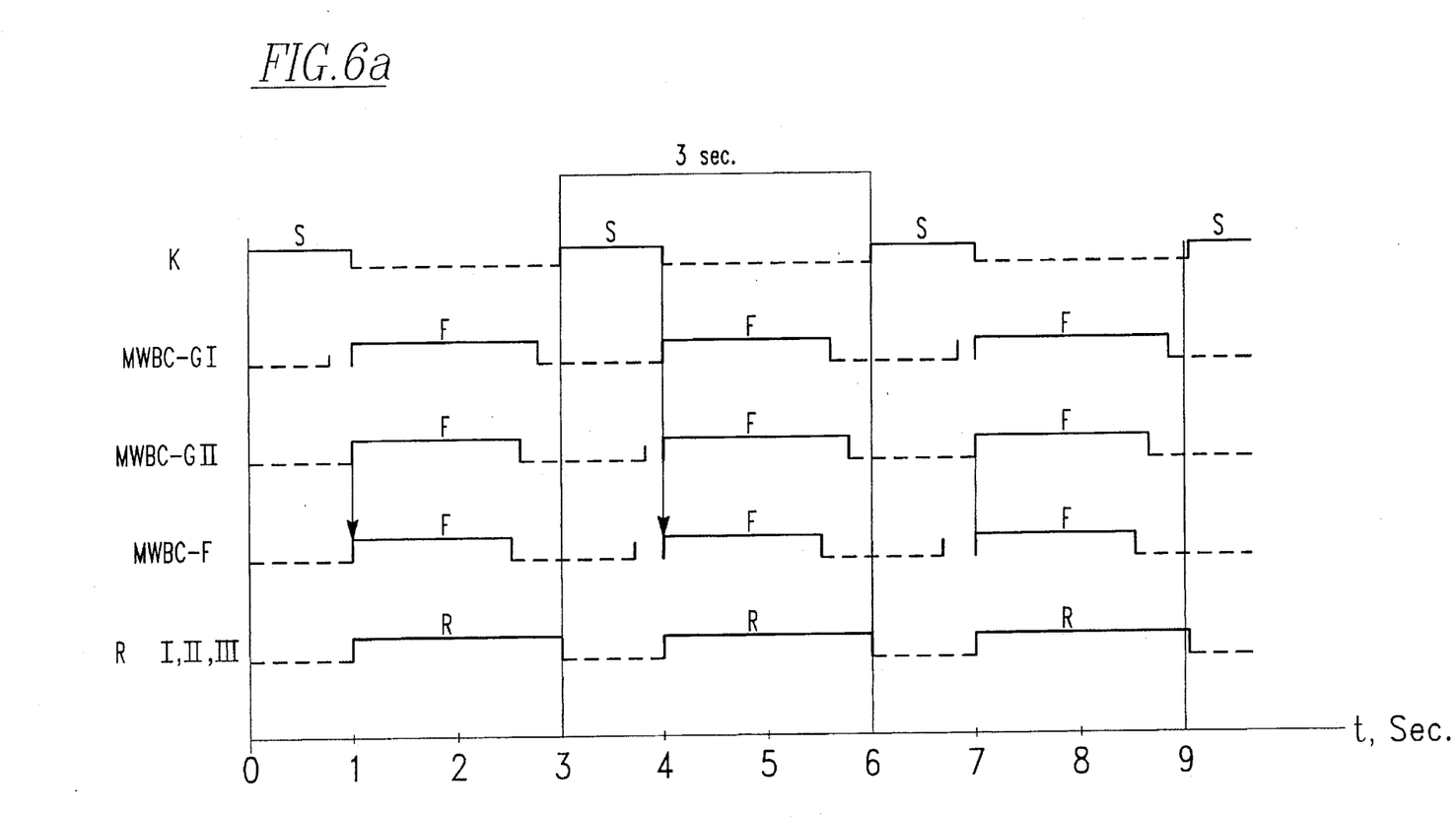

FIG. 6a shows the coordinated sequence of operations of the packing device shown in FIG. 6 analogously to FIG. 2a. K=carousel; MWBC-GI=differential packer and weigher, fast feed I; MWBC-GII=differential packer and weigher, fast feed II; MWBC-F=differential packer and weigher, dribble feed; R=agitator.

Figure 7:
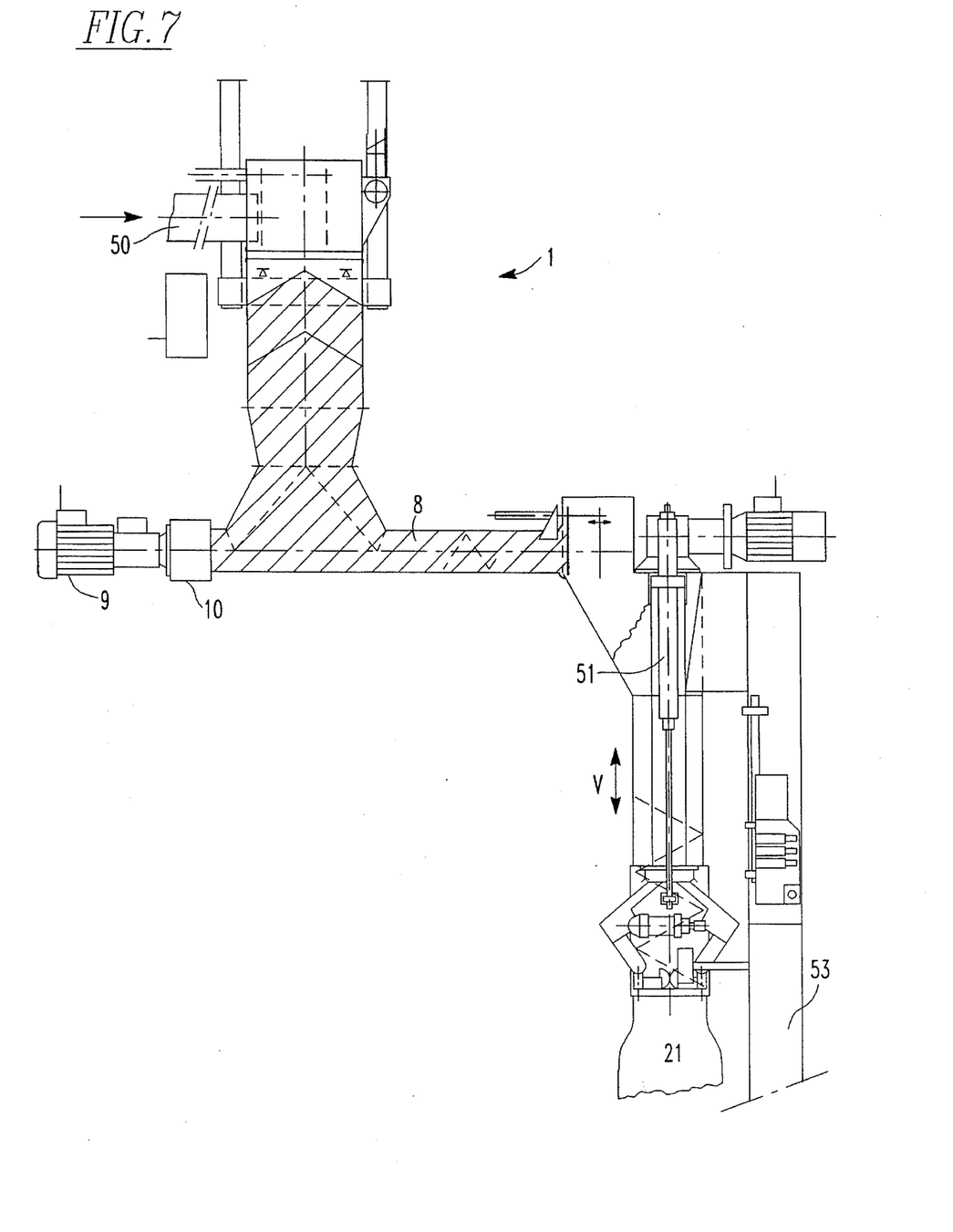
FIG. 7 shows a solution analogous to that of FIG. 1, but with a bag packing machine.

FIG. 7 shows another somewhat more accessible embodiment form of a so-called bag packing machine having a single bag filling sleeve. An individual bag 21 is suspended in a manner analogous to FIG. 1 and a telescoping bag filling sleeve executes a vertical movement V so as to avoid forming any dust in the bag 21. The filling is effected in this case via a driven filling screw 50. The vertical movement is effected via a pneumatic cylinder 51. This packing device, known as a bag packing machine, is supported on the floor via a support 53 in a manner analogous to FIG. 1. The desired data for the sequence of movements are entered by an operator via an input device. A packing program then proceeds via a control device 55 or the corresponding weigher control unit 55.

Figure 8:
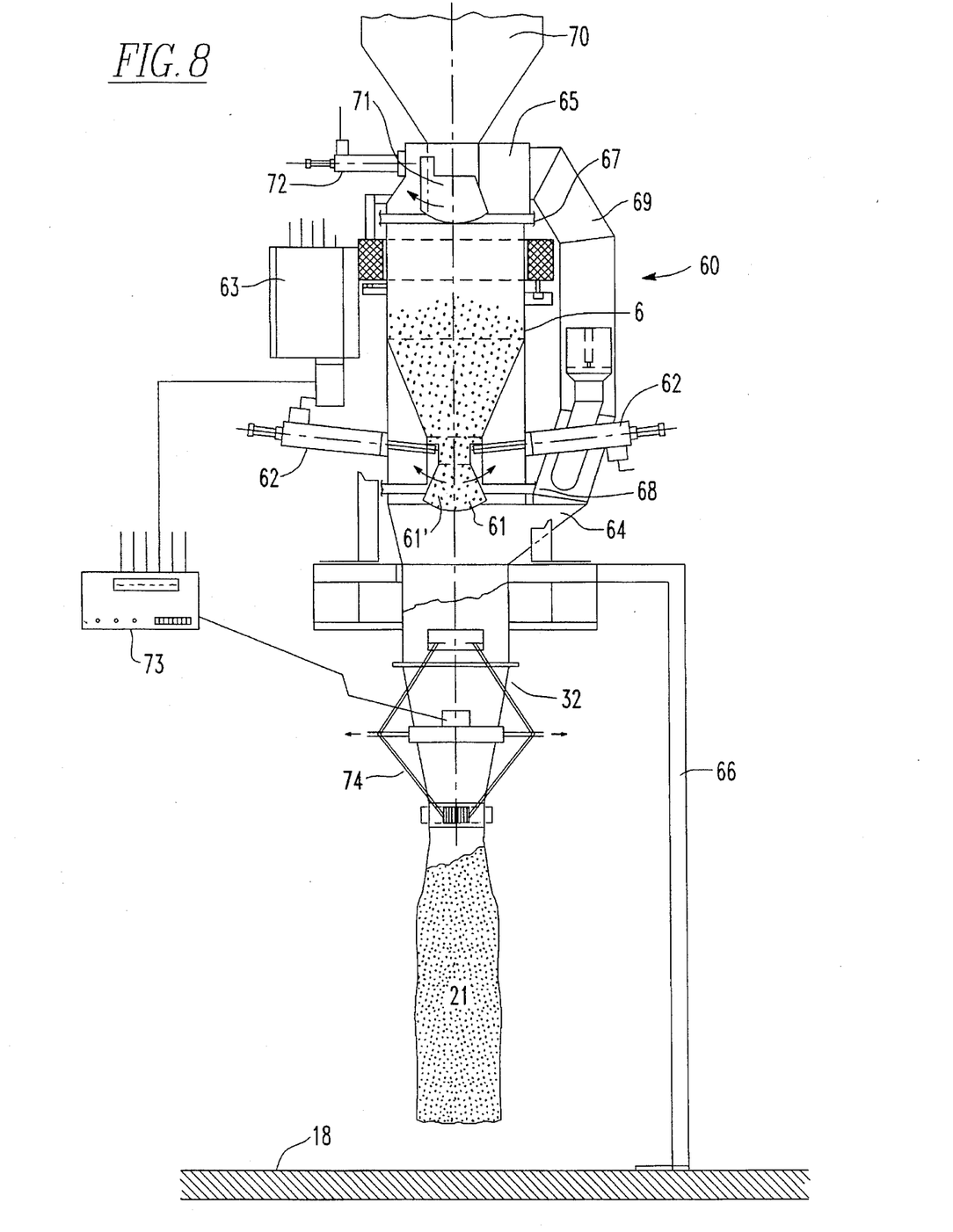
FIG. 8 shows a 4-sleeve packing carousel for pourable bulk materials.

FIG. 8 shows a differential weigher 60 for free flowing materials with adjustable discharge proportioning slide 61, 61' instead of the differential weigher 1 of FIG. 1 with compulsory discharge. Different proportioning positions can be selected via pneumatic cylinders 62 and the weigher control unit 63 to obtain a rapid but optimal filling of the bags. Some very interesting combinatorial effects now take place. A collecting hopper 64 is constructed in one constructional unit with the bag filling sleeve 32. Both parts are securely supported on the floor 18 in the manner of a feed head 65 via a support 66. The weighing container 6 also has the same cross section as the fixed transition pieces at the top and bottom in the region of rubber sleeves 67 and 68, respectively. All of the air displaced at the bottom of the bag is now directed to the top over a large cross section via an air compensating pipe 69 so that neither dust nor differential pressure problems occur between the top and bottom.

A controllable slide 71 which is actuated via a pneumatic cylinder 72 is arranged in the feed head 65 below a hopper 70. The weigher electronics are connected directly to a control box 73 from which the main work commands are given, as well as to a partially automatic bag clamping device 74.

Figure 9:
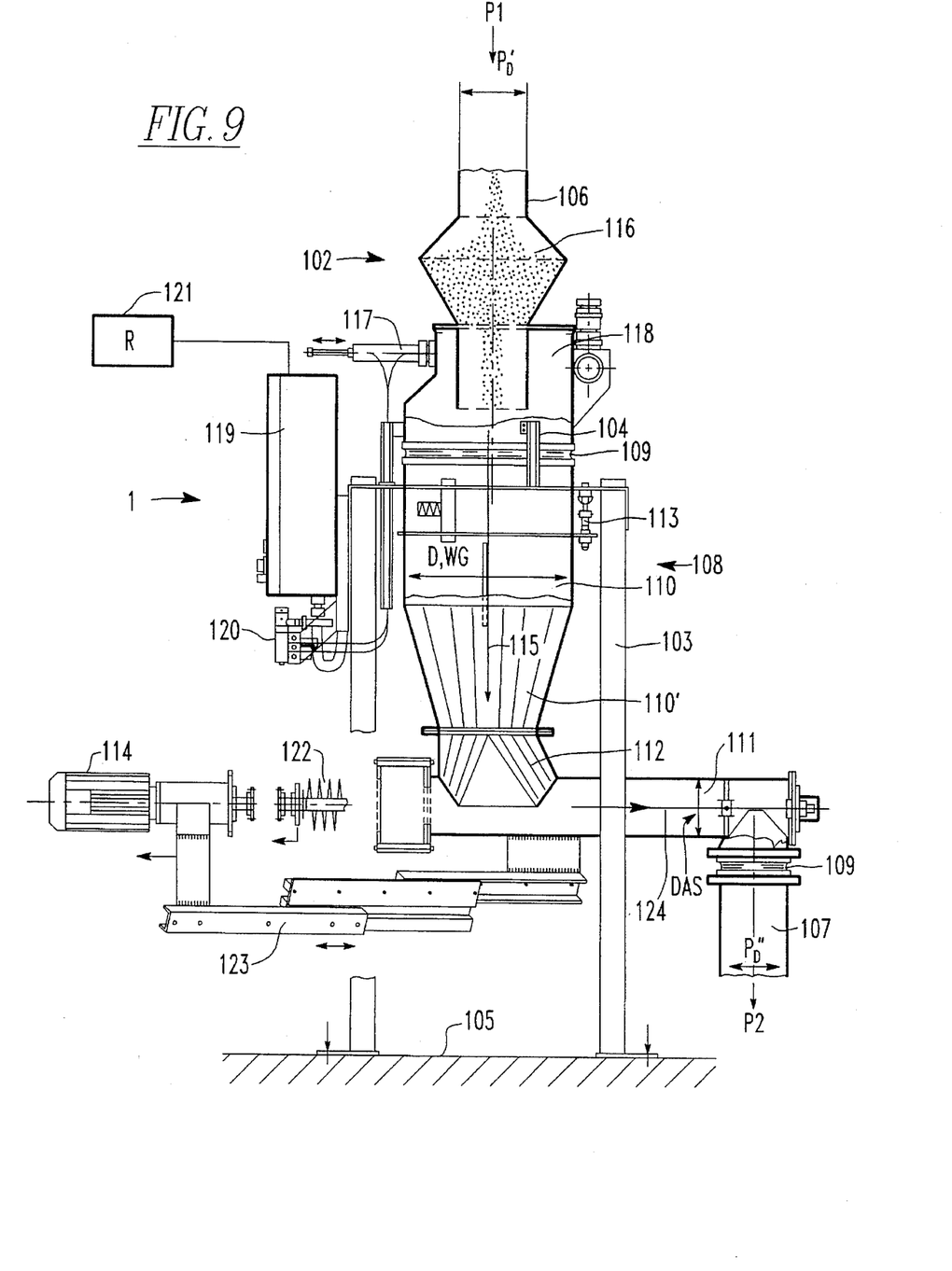
FIG. 9 is an enlarged view of a differential packer and weigher for materials with heavy flowing properties.

Reference is made in the following to FIG. 9. The production flow P1 enters vertically at the top into a differential weigher 1 for materials having heavy flow properties and exits again at the bottom as P2. The flow measuring device has a feed head 102 which is securely connected with a platform 103 via brackets 104 and is supported on the floor 105. An inlet pipe 106 and an outlet pipe 107 are stationary. The weighing part 108 is connected so as to be tight against dust relative to the feed head 102 and outlet tube 107 via a flexible rubber sleeve 109 in each instance. The weighing part 108 includes an upright weigher container 110 which has a slight conical taper 110' in the lower portion. The weigher container 110 and the conical taper are constructed as a round pipe shape. A transition piece 112 which optimally ensures the transition from the upright pipe shape of the weigher container 110 into a horizontal pipe shape of the discharge screw 111 in technical respects relating to product flow is arranged between the weigher container 110 and a discharge screw 111. As in FIG. 1, the transition piece 112 has an approximately constant cross section from top to bottom and has a shape ranging from round to rectangular in the embodiment example. The weighing part 108 is suspended in the circumferential direction at e.g. three weight measurement value receivers 113 at the platform 103. The suspension of the entire weighing part 108 including a drive motor 114 is of great importance, since the drive motor 114 and the discharge screw 111 project out in opposite directions along the weighing part 108 and maintain an equilibrium relative to one another to a certain extent with respect to a center axis 115. A preliminary bin 116 is located directly at the inlet pipe 106 and is controllable by a pneumatic cylinder 117 and a base flap 118 via an electronic control unit 119 and a pneumatic signal shaper 120, respectively, according to a selectable program. The reference values for the product discharge are obtained from an external computer 121 and the actual-value weight signals from the weight measurement value receiver 113.

The preliminary bin has less than 50% of the maximum container capacity of the weigher container 110, preferably approximately 30% to 90%. But here again conventional application of a differential weigher is very deliberately avoided, since only a part may be stored in a preliminary way for filling the weighing container so that the feed can likewise be detected by technical weighing means, which is important for detecting a production flow when additional regulating devices for the inlet are not provided.

The weigher container is approximately twice the height of its diameter. The diameter can amount to 0.3 to 0.6 m. The tube screw conveyor has a diameter of 1.100 to 0.250 m so that the mean ratio of weigher container cross section to tube screw conveyor cross section is approximately 1:10.

FIG. 9 shows another particularly significant constructive idea in that the drive motor 114, with or without flanged on discharge screw shaft 122, can be moved out in the direction of the axis 124 of the discharge screw 111 in the manner of a drawer via pull-out means 123. This makes it possible for very high demands to be met with respect to maintaining the cleanliness of the product path.

The product falls steadily in the vertical direction in the upright weigher container 110, is guided with the transition part 112 directly into the intake of the discharge screw shaft 122 and is discharged horizontally from the weigher container 110 and delivered continuously, again in a vertical manner, via the outlet pipe 7 with renewed monitoring by technical measuring equipment.

While the foregoing description and drawings represent the preferred embodiments of the present invention, it will be obvious to those skilled in the art that various changes and modifications may be made therein without departing from the true spirit and scope of the present invention.

What is claimed is:

1. An automatic filling apparatus for preparing a multiplicity of portions of bulk material from a material feeder and for filling each portion in shipping packages, each filled package having a predetermined exact weight, the apparatus comprising:

a packing device for holding the shipping packages;

at least one differential weigher, the weigher including a controllable product discharge device fixedly attached thereto, the discharge device being arranged horizontally and having a distal end with an opening adjacent and above the packing device wherein the bulk material is discharged from the at least one differential weigher through the packing device and directly into the shipping packages.

2. The automatic filling apparatus of claim 1, wherein the opening has a controllable closing device.

3. The automatic filling apparatus of claim 1, wherein the packing device includes a filling sleeve for receiving the material from said opening and directing the received material into the shipping bags, the filling sleeve being arranged generally vertically.

4. The automatic filling apparatus of claim 1, wherein the packing device includes a filling sleeve for receiving the material from said opening and directing the received material into the shipping bags, the filling sleeve having a smoothly changing internal configuration for minimizing held material.

5. The automatic filling apparatus of claim 1, wherein the packing device is a packing carousel, the packing carousel having a plurality of filling sleeves.

6. The automatic filling apparatus of claim 1, wherein the at least one differential weigher further includes:

an upright weighing container; and a transition piece between the weighing container and the controllable product discharge device.

7. The automatic filling apparatus of claim 1, wherein the controllable product discharge device includes a coarse proportioning means and a fine proportioning means.

8. The automatic filling apparatus of claim 1, wherein the controllable product discharge device includes a variable discharge screw.

9. The automatic filling apparatus of claim 1, wherein the controllable product discharge device includes an adjustable discharge proportioning slide.

10. The automatic filling apparatus of claim 1, wherein the apparatus further comprises:

at least one coarse material differential weigher; and at least one fine material differential weigher.

11. The automatic filling apparatus of claim 5, wherein two differential weighers are associated with one filling sleeve of the packing carousel.

12. The automatic filling apparatus of claim 1, wherein the packing device includes a compression system.

13. The automatic filling apparatus of claim 1, the apparatus further comprises a control system for controlling the apparatus.

14. An automatic filling apparatus for preparing a multiplicity of portions of bulk material from a material feeder and for filling each portion in shipping packages, each filled package having a predetermined exact weight, the apparatus comprising:

at least one differential weigher, the weigher including a controllable product discharge device fixedly attached thereto, the discharge device being arranged horizontally and having a distal end with an opening therein; and a packing device for guiding the bulk material from the opening of the at least one differential weigher into said shipping packages by gravitational force.

15. An automatic filling apparatus for preparing a multiplicity of portions of bulk material from a material feeder and for filling each portion in shipping packages, each filled package having a predetermined exact weight, the apparatus comprising:

a packing device for holding the shipping packages;

at least one differential weigher, the at least one weigher including a horizontally-oriented controllable product discharge device fixedly attached thereto, the at least one differential weigher and discharge device together defining a material flow path from the material feeder to the shipping packages, said differential weigher holding essentially all of the bulk material between the material feeder and the shipping packages.

16. An automatic filling apparatus for preparing a multiplicity of portions of bulk material from a material feeder and for filling each portion in shipping packages, each filled package having a predetermined exact weight, the apparatus comprising:

a packing device for holding the shipping packages;

at least one differential weigher, the weigher including a controllable product discharge device fixedly attached thereto, the discharge device having a discharge proportioning slide means controlling an opening adjacent and above the packing device wherein the bulk material is discharged from the at least one differential weigher through the packing device and directly into the shipping packages.

17. The automatic filling apparatus according to claim 16 wherein the slide means includes a pair of opposed slide members and separate actuating means operatively connected thereto.

18. The automatic filling apparatus according to claim 16 wherein the packing device is flexibly connected to the differential weigher and includes an air compensating pipe operatively connectable to the material feeder.

19. The automatic filling apparatus according to claim 16 wherein the packing device includes a package clamping device.

20. A method for preparing a multiplicity of portions of bulk material and for filling each portion in shipping packages, each shipping package having a predetermined exact weight, the method employing an automatic filling apparatus having product feeder, a differential weigher that includes a horizontally-oriented discharge device fixedly attached to the differential weigher, and a packing carousel for filling a plurality of shipping packages, the method comprising the steps of:

delivering bulk material from the product feeder into the differential weigher;

stopping the delivery of material into the differential weigher for a predetermined time; and horizontally dispensing the predetermined exact weight portion from the differential weigher into the shipping bags through the packing carousel during the step of stopping the delivery of product.

* * * * *